United States Patent
Pin et al.

(10) Patent No.: US 7,313,300 B1
(45) Date of Patent: Dec. 25, 2007

(54) SYSTEMS AND METHODS FOR MANUFACTURING COAXIAL OPTICAL COMPONENTS

(75) Inventors: David Pin, Millbrae, CA (US); Johnny Zhong, Union City, CA (US); Steve Wang, San Jose, CA (US); Yin Zhang, San Jose, CA (US); Lewis Leung, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 95 days.

(21) Appl. No.: 10/697,456

(22) Filed: Oct. 30, 2003

Related U.S. Application Data

(60) Provisional application No. 60/422,822, filed on Oct. 30, 2002.

(51) Int. Cl.
*G02B 6/32* (2006.01)
*G02B 6/36* (2006.01)

(52) U.S. Cl. .............................. 385/33; 385/58; 385/78

(58) Field of Classification Search ................. 385/31, 385/33–35, 52, 60, 76–80
See application file for complete search history.

(56) References Cited

U.S. PATENT DOCUMENTS

| | | | | |
|---|---|---|---|---|
| 6,343,166 B1 * | 1/2002 | Hellman et al. | ............... | 385/31 |
| 6,454,465 B1 * | 9/2002 | Uschitsky et al. | ............ | 385/79 |
| 6,582,135 B2 * | 6/2003 | Brun et al. | ................... | 385/78 |
| 6,798,949 B2 * | 9/2004 | Liu et al. | ...................... | 385/33 |
| 6,978,068 B2 * | 12/2005 | Wilson et al. | ................ | 385/52 |
| 2003/0063853 A1 * | 4/2003 | Huang et al. | ................. | 385/34 |
| 2003/0077047 A1 * | 4/2003 | Hwang et al. | ................ | 385/79 |

\* cited by examiner

*Primary Examiner*—Tina M. Wong
(74) *Attorney, Agent, or Firm*—Workman Nydegger

(57) ABSTRACT

A coaxial optical component and method of packaging and manufacturing a coaxial optical component. A dual fiber collimator is formed from a dual fiber pigtail and a collimating lens. The dual fiber pigtail and the collimating lens are adequately aligned such that the optical loss is minimized. Spacers are placed around the dual fiber collimator and epoxy is placed between the spacers and around the dual fiber collimator. The dual fiber collimator and the spacers are inserted in one end of a metal housing and aligned before the epoxy is cured. The spacers thus position the dual fiber collimator within the housing while separating the dual fiber collimator from the housing. The metal housing includes an extended portion adapted to receive another optical element for use with the dual fiber pigtail. Alternatively, the dual fiber collimator is replaced with a different optical element and secured within the metal housing.

20 Claims, 3 Drawing Sheets

SYSTEMS AND METHODS FOR MANUFACTURING COAXIAL OPTICAL COMPONENTS

CROSS-REFERENCE TO RELATED APPLICATIONS

This application claims the benefit of U.S. Provisional Application No. 60/422,822, filed Oct. 30, 2002, which is incorporated herein by reference.

BACKGROUND OF THE INVENTION

1. The Field of the Invention

The present invention relates to systems and methods for manufacturing coaxial fiber optic components. More particularly, the present invention relates to systems and methods for manufacturing and packaging integrated coaxial fiber optic components for use in optical networks.

2. The Relevant Technology

Fiber optic networks are becoming increasingly common and have several advantages over existing electrical networks. One of the primary advantages of fiber optic networks is related to the bandwidth and data transmission potential of a fiber optic network. To effectively use, analyze, and monitor fiber optic networks, however, certain optical devices or components are often needed. One group of components or devices used in fiber optic networks is coaxial fiber optical components. Coaxial fiber optical components may be used to divide the light or extract a particular portion or frequency from the light being carried in the fiber optic network.

Fiber optical components include three-port optical components or devices, such as optical taps, add/drop modules, and the like. Fiber optical components are often used to extract a portion of the transmitted light beam or redirect a portion or particular wavelength(s) of the light beam. The light extracted or redirected by the optical component is often related to the purpose or function of the fiber optical component. For example, a fiber optic tap may be used to extract a small percentage of the entire light beam of an optical network. The extracted portion of light can be used to monitor the fiber optic network by using a network analyzer on the extracted portion.

Coaxial devices can also be used to extract information intended for a particular device on the network. In one example, a fiber-optic network may use a coarse wavelength division multiplexing (CWDM) scheme to increase the capacity of data transmittable in the fiber-optic network. A CWDM scheme transmits several channels of data along a single fiber-optic cable where the channels are defined by a carrier beam that is centered around a particular wavelength of light.

A three port optical component can be used to separate or combine a channel of interest from the other channels. In this case, all of the channels enter the optical component through one of the ports. The channel of interest is diverted such that it exits the three port optical component through one of the remaining ports. The remaining channels exit the three port optical component through the other port. Conversely, the three port optical component can also be used to add (combine) a channel back into the light stream.

Many of the problems associated with three port optical components and other devices such as optical taps, add/drop modules, optical isolators, and the like as well as other fiber optical components, relate to the manufacturing and packaging process of the particular optical component. Many of these optical components are assembled from discrete components. Problems related to optical alignment, optical matching, and transmission loss are often associated with optical components that are assembled from these discrete components.

FIGS. 1A, 1B, and 1C illustrate these and other problems that are often a result of a traditional manufacturing and/or packaging process. FIGS. 1A, 1B, and 1C illustrate the packaging process of a typical optical component. FIG. 1A illustrates a dual fiber sub-assembly 100 being attached with a filter substrate 104. The dual fiber sub-assembly 100 typically includes a dual fiber collimator 106 that is enclosed within a housing 102. The dual fiber collimator 106 typically includes a dual fiber pigtail and a collimating or focusing element such as a graded index (GRIN) lens.

The dual fiber sub-assembly 100 is a discrete element of many optical components. The optical alignment and optical matching of the finished optical component 130 (shown in FIG. 1C) is affected early in the manufacturing process when the dual fiber collimator 106 is pre made because the optical elements included in the dual fiber sub-assembly 100 may not be adequately aligned and/or matched. In addition, the transmission loss of the dual fiber collimator 106 may not be minimized.

The dual fiber sub-assembly 100 further includes a housing 102 that surrounds the dual fiber collimator 106. The housing 102 is necessary to ensure that the fiber pigtail and collimating or focusing element that make up the collimator lens 106 are securely connected. After the filter substrate 104 is attached with the dual fiber collimator 106, the dual fiber sub-assembly 100 is baked.

FIG. 1B illustrates the next steps in current manufacturing processes of many optical components including three port devices. The sub-assembly 100 is inserted into a housing 112 that is sufficiently large to accommodate the sub-assembly 100 and a single fiber collimator 120. The housing 112 includes holes 114 and 116 that are used to solder the housing 112 to the sub-assembly 100 and the single fiber collimator 120.

In this example, the three port device is manufactured by inserting the sub-assembly 100 into one end of the housing 112 and soldering the housing 112 to the housing 102 of the sub-assembly 100 using the holes 114. Similarly, the single fiber collimator 120 is also inserted into the opposite end of the housing 112 and soldered in place using the holes 116. Because both the sub-assembly 100 and the single fiber collimator 120 are mounted in the housing 112 in this manner, it is often difficult to ensure that they are adequately aligned and/or matched. In addition, the optical loss may not be minimized.

FIG. 1C illustrates a manufactured optical component. In addition to problems with optical alignment, optical matching, and transmission losses, the optical component 130 includes more than one housing. In particular, the dual fiber sub-assembly 100 includes a housing 102 that is independent of both the housing 112 and the housing 124 of the single fiber collimator 120. In other words, the housing 112 surrounds both the housing 102 of the sub-assembly 100 and the housing 124 of the single fiber collimator 120.

Generally, constructing a coaxial optical component such as the optical component illustrated in FIGS. 1A, 1B, and 1C requires that the discrete elements that make up the optical component 130 be separately purchased or pre-built and assembled. In this example, it is necessary to purchase or pre-build the dual fiber collimator 106, the filter substrate 104, the single fiber collimator 120, and the housing 112. The discrete elements are then assembled as described above. Because the individual elements are purchased or pre-built separately, the overall cost of the assembled optical component is increased due to reduced yield. Additionally, discrete elements that are purchased pre-built and assembled in this manner may not be adequately matched and/or aligned. Further, some of the discrete elements are redundant.

BRIEF SUMMARY OF THE INVENTION

These and other limitations are overcome by the present invention which is directed to systems and methods for manufacturing and packaging coaxial optical components. The present invention packages coaxial optical components that are adequately aligned, optical matched, and that have reduced transmission losses between the optical elements that make up the coaxial optical component.

Packaging or manufacturing a coaxial optical component begins, in one embodiment, by attaching an optical filter substrate to a collimating lens. A dual fiber collimator is then formed by attaching the collimating lens with a dual fiber pigtail. The collimating lens and the dual fiber pigtail are adequately aligned and matched. Also, the collimating lens is connected with the dual fiber pigtail through soldering such that the transmission loss is minimized.

Next, glass spacers are disposed around the dual fiber collimator. The spacers are used to position the dual fiber collimator within a metal housing. Epoxy is typically applied to the dual fiber collimator. The dual fiber collimator, along with the spacers, is inserted in the metal housing. The spacers rest against the inside surface of the housing while holding the dual fiber collimator. The dual fiber collimator is then aligned within the housing before the epoxy is fully cured.

The housing includes an extended portion that can be used to accommodate other optical elements or components within the housing. In one example, a single fiber collimator may be inserted within the extended portion of the housing such that it is aligned with the dual fiber collimator to form a three port optical component. In addition, the single fiber collimator is not secured until a transmission loss between the dual fiber collimator and the single fiber collimator is minimized.

One of the advantages of the present invention is that the cost of the coaxial component is reduced with better yield because the dual fiber collimator is integrated with the coaxial component packaging. The coaxial component reduces the number of discrete element previously needed and results in an integrated package. In addition, the optical losses are reduced with lower temperature dependent loss variation because the dual fiber collimator is integrated with the coaxial component packaging. Finally, the physical size of the coaxial optical component described herein is reduced.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Coaxial optical components are useful building blocks in fiber-optic networks and can be used for a wide variety of different applications. Typical coaxial optical components or devices include three port optical components, optical isolators, inline optical taps, add/drop modules, and the like or any combination thereof. The operation of these optical components is well known in the art.

Each of these components, however, has various attributes that impact their usefulness in fiber optic networks. Factors such as whether an optical component is adequately matched or aligned and whether the optical component has a significant transmission loss have an impact on the usefulness of the optical component. As previously described the impact of these factors can vary as the optical component is assembled from discrete components.

The present invention relates to systems and methods for manufacturing or packaging coaxial optical components and more particularly to manufacturing coaxial optical components that have the advantages of being better optically matched and/or aligned than optical components that are manufactured or packaged from discrete components. Optical components manufactured or packaged as described herein also benefit from lower optical losses and lower temperature dependent loss variation because the dual fiber collimator is integrated with the coaxial component packaging. It also has smaller footprint. Finally, the present invention reduces the cost of coaxial optical components.

Figure 2A:
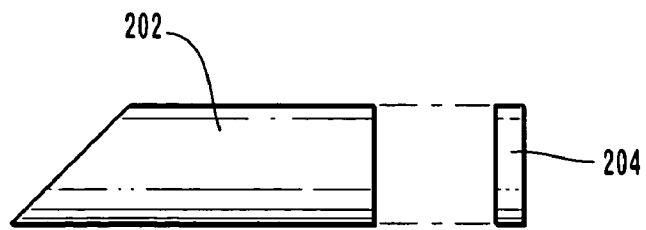
FIG. 2A is a side view of a collimating lens being attached with a filter substrate.

FIGS. 2A, 2B, 2C, 2D, and 2E are used to more fully illustrate and describe exemplary embodiments of the present invention. These Figures are exemplary in nature and are not necessarily drawn to scale. FIG. 2A illustrates a cross sectional view of a collimating lens 202 and an optical filter substrate 204. The optical filter substrate 204 is attached to the collimating lens 202. The optical filter substrate 204 is an example of a filtering means. In one embodiment, the optical filter substrate 204 is a thin film substrate that includes layers of material with different indexes of refraction. The optical filter substrate 204 may be designed for use in an optical power tap, and add/drop module, and the like. The collimating lens 202 may be a GRIN lens, a c-lens, and the like or any combination thereof.

Figure 2B:
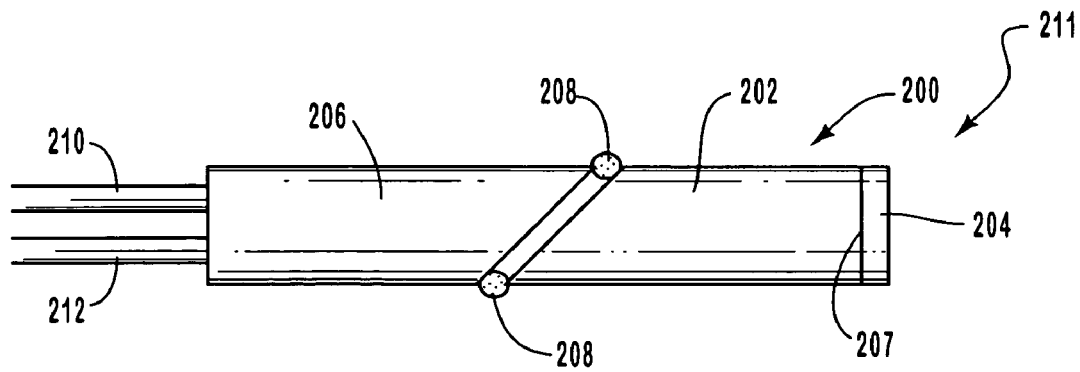
FIG. 2B illustrates the alignment and attachment of a dual fiber pigtail with the collimating lens of FIG. 2A to form a dual fiber collimator.

FIG. 2B further illustrates an exemplary process for manufacturing a coaxial optical component. After the collimating lens 202 is attached with the filter substrate 204 at a front face 207 of the collimating lens 202, a dual fiber pigtail 206 is aligned with the collimating lens 202. The dual fiber pigtail 206 is aligned such that the reflection loss is minimized between the dual fiber pigtail 206 and the collimating lens 202. When the dual fiber pigtail 206 is properly aligned with the collimating lens 202, the dual fiber pigtail 206 and collimating lens are connected such as by applying optical epoxy 208 to secure the aligned components to form a dual fiber collimator 211. The epoxy is then cured in one example by baking at a curing temperature. The dual fiber collimator 211 does not have a housing in this embodiment and is adequately matched and/or aligned. At the interface between the dual fiber pigtail 206 and the collimating lens 202, the respective faces are beveled to minimize back reflections into the light source. In one exemplary embodiment, the dual fiber pigtail 206 has a front face that is at an angle that is parallel to a rear face of the collimating lens 202.

Figure 2C:
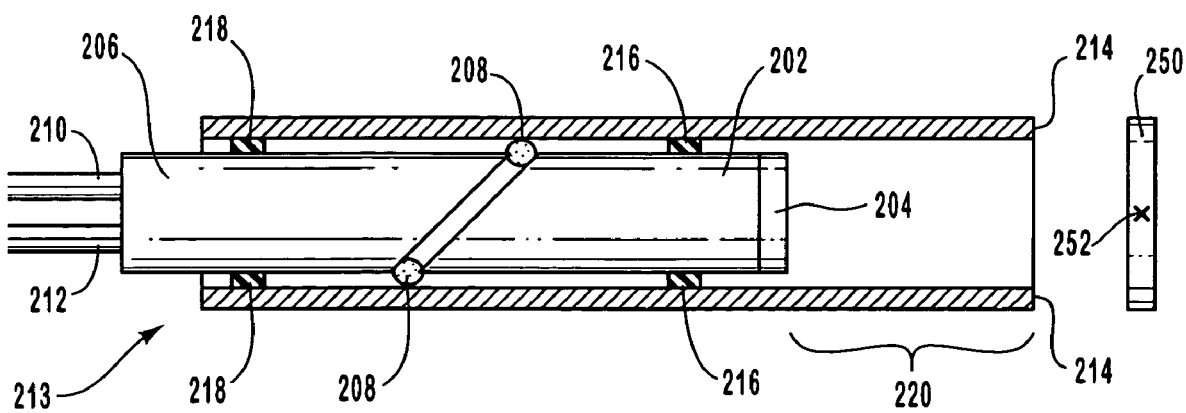
FIG. 2C illustrates the dual fiber collimator of FIG. 2B after being inserted in a metal housing with an extended portion to form a coaxial optical component.

FIG. 2C further illustrates an exemplary manufacturing or packaging process on a coaxial component 213. After the dual fiber collimator 211 is formed, spacers 216 and 218 are secured around the dual fiber collimator 211. In one example, the spacer 216 is placed around the collimating lens 202 and the spacer 218 is placed around the dual fiber pigtail 206. Next, optical epoxy is placed between the spacer 218 and the spacer 216. Then, the dual fiber collimator with the spacers is inserted into a first end 215 of a housing 214. The housing 214 is typically tube shaped and made of an appropriate metal. The housing 214 has an extended portion 220 at the second end 217 to accommodate the insertion of other optical elements or components such as single fiber collimators and the like. FIG. 2C thus illustrates a completed coaxial component 213. In this example, the coaxial component 213 illustrated in FIG. 2C only has a single metal housing 214 and the optical components housed therein are adequately matched and/or aligned.

The alignment of the coaxial component 213 is further improved by using an aligning means such as an alignment control 250 that is also illustrated in FIG. 2C. The alignment control 250 is used to ensure that the dual fiber collimator 211 is properly aligned and/or positioned within the housing 214. In one example, a light beam is directed into the dual fiber collimator 211 through the fiber 210. The light beam is collimated by the dual fiber collimator 211 and exits the dual fiber collimator through the filter substrate 204. After exiting the dual fiber collimator 211, the light beam is displayed on the alignment control 250.

The alignment control 250 has a center mark 252, created by a golden sample, that indicates proper alignment of the dual fiber collimator 211. The dual fiber collimator 211 is positioned within the housing 214 as the epoxy cures such that the light beam falls on the center mark 252. This ensures that the dual fiber collimator 211 is properly aligned within the housing 214. Next, the coaxial component 213 is baked under a curing temperature.

Figure 2D:
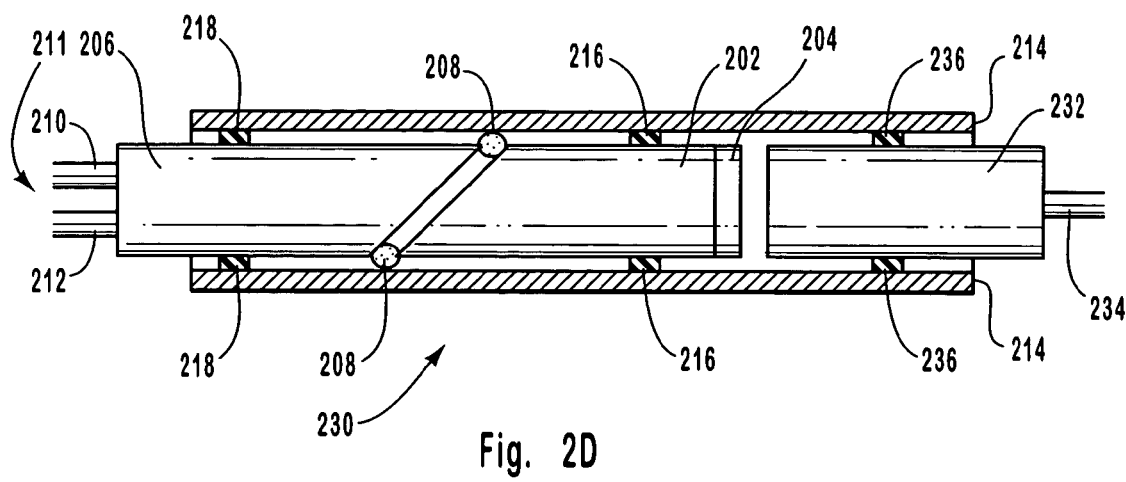
FIG. 2D illustrates the coaxial optical component of FIG. 2C that is connected with a single fiber collimator to form a three port optical device.

FIG. 2D illustrates the coaxial component of FIG. 2C that is coupled with a single fiber collimator 232 using the extended portion 220 of the housing 214 to form an optical device 230. As previously described, the dual fiber collimator 211 is aligned within the housing 214. As the single fiber collimator 232 is inserted into the housing 214, it can be aligned with the dual fiber collimator 211 such that the transmission loss between the respective collimators is minimized.

After the alignment is complete, the single fiber collimator 232 is secured within the housing 214 using, in one example, epoxy 236. Alternatively, a spacer may also be used to hold the single fiber collimator 232. In yet another embodiment, the single fiber collimator 232 is soldered to the housing 214. In each case, the single fiber collimator 232 is aligned and adequately matched such that the optical loss is minimized. The optical device 230 may then be subjected to temperature cycling to release stress and to stabilize the assembly of the optical device 230.

Figure 2E:
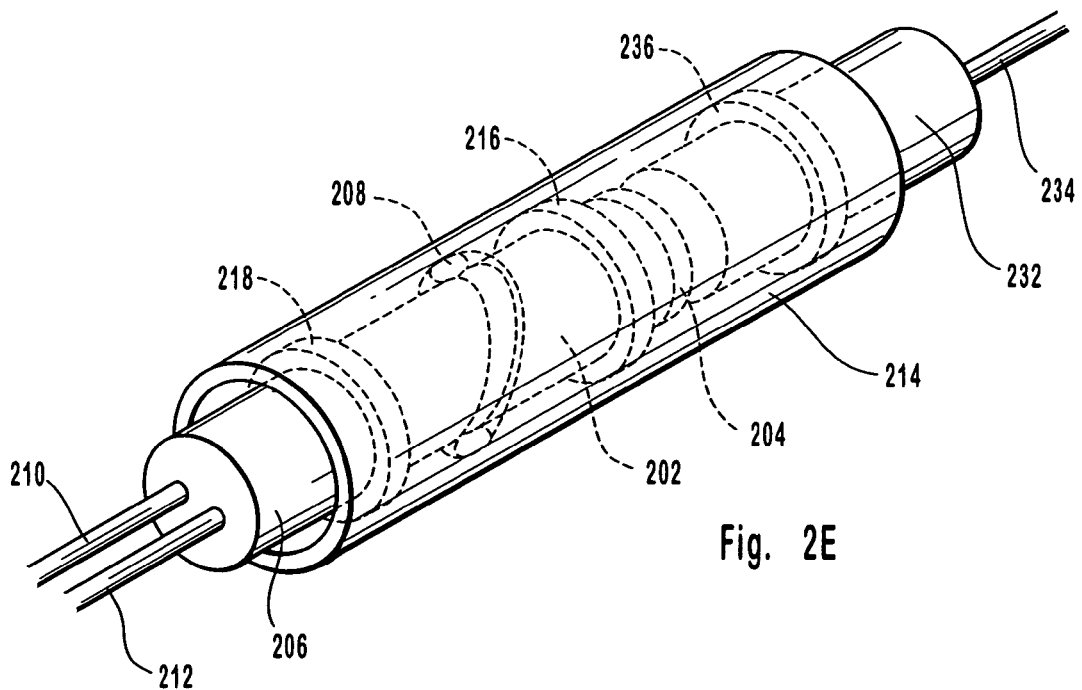
FIG. 2E is a perspective view of the three port optical device shown in FIG. 2D.

FIG. 2E is a perspective view of the optical component or device 230 illustrated in FIG. 2D. FIG. 2E illustrates that the spacers 218 and 216 surround the dual fiber collimator 211 within the housing 214 and that the spacers 218 and 216 rest against the inside surface of the housing 214. The spacers are configured to fit within the housing 214 and help position the dual fiber collimator (or other optical component) within the housing. More particularly, the spacers 218 and 216 are configured such that the dual fiber collimator is positioned or rests against the inside surfaces of the spacers. In addition, the spacers 216 and 216 are also shaped or configured such that the outside surfaces of the spacers rest against or are positioned against an inside surface of the metal housing when the spacers and the dual fiber collimator are inserted within the metal housing.

FIGS. 2A through 2E illustrate an exemplary systems and methods for packaging or manufacturing coaxial optical components. Generally, a first optical component or element is formed (such as the dual fiber collimator described herein). The optical element formed is dependent of the optical component being packaged or manufactured. If the optical element is an isolator, for example, then the discrete components of the isolator are connected and aligned as required.

Next, spacers are placed around the optical element. Epoxy is applied between the spacers and/or around the optical element. The spacers and the optical element are then inserted within a first end of the metal housing. The spacers hold and position the optical element within the housing and the optical element is aligned before the epoxy is fully cured. The housing includes an extended portion that can accommodate an additional optical element within the housing. Thus, the present invention is not limited to the optical component illustrated in FIGS. 2A through 2E, but can be applied to other optical elements that include, but are not limited to, add/drop components, isolators, optical taps, circulators and the like or any combination thereof.

The manufacturing or packaging systems and methods described herein have the advantage of lower cost with better yield because the dual fiber collimator is integrated with the coaxial component packaging. The reflection loss is reduced, in one embodiment, by adequately matching and aligning the dual fiber pigtail with the collimating lens and by aligning the dual fiber collimator within the housing of the coaxial component. It also has lower temperature dependent loss variation because the dual fiber collimator is integrated with the coaxial component packaging.

Figure 1A:
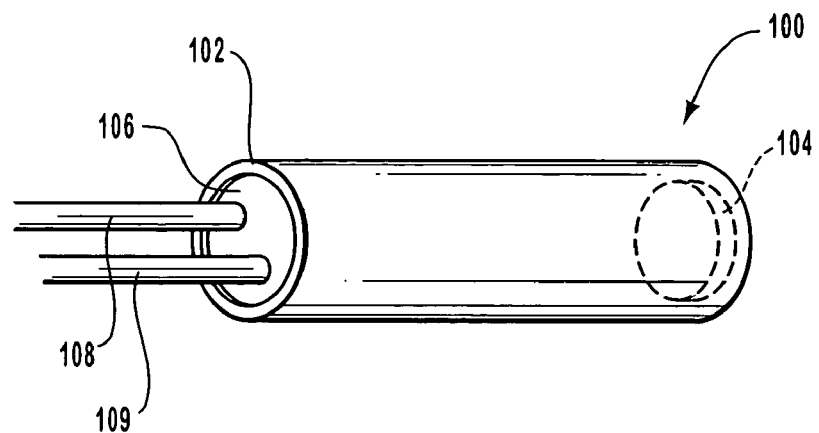
FIG. 1A is a perspective view of a dual fiber collimator that is being attached with a filter substrate.
Figure 1B:
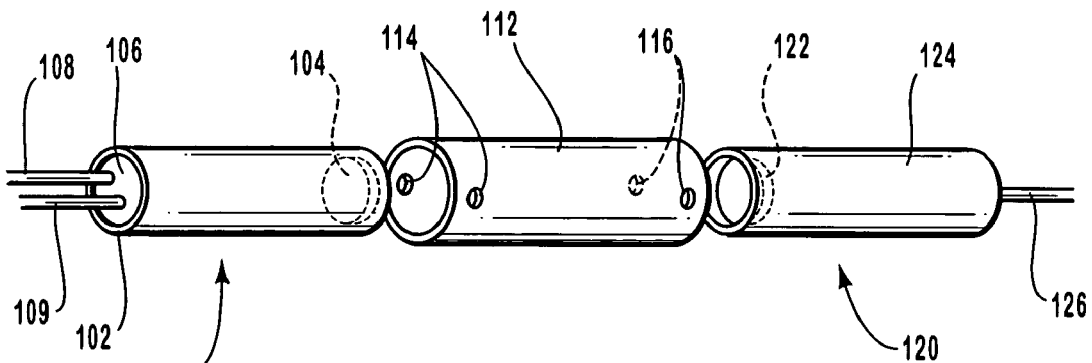
FIG. 1B is an expanded perspective view of the assembly of a three port optical device.
Figure 1C:
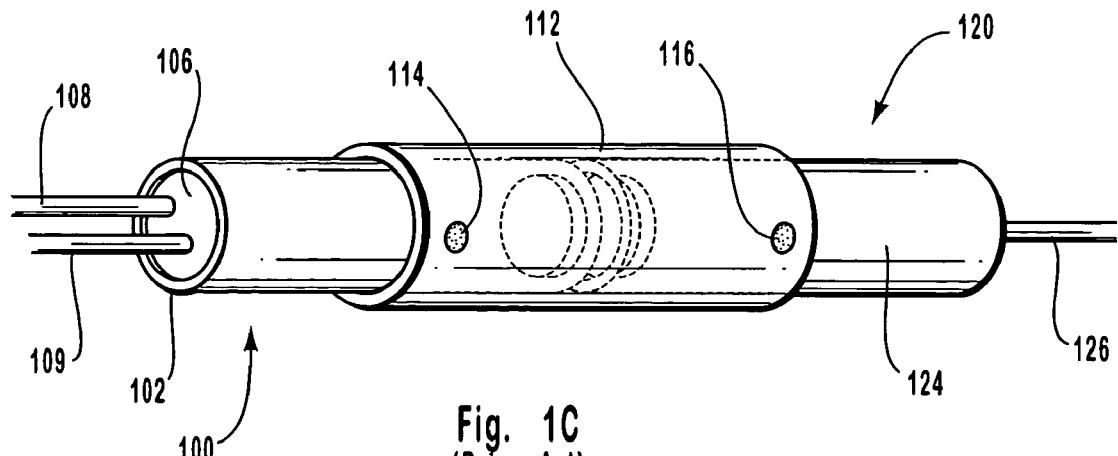
FIG. 1C illustrates an assembled three port optical device that includes multiple housings.

Another advantage of the present invention is related to the overall length of the packaged coaxial optical component. Referring to FIG. 2C, the housing 214 includes an extended portion 220. Including the extended portion 220 enables the optical device 230 to have a shorter length than it would have if packaged as described with reference to FIGS. 1A, 1B, and 1C. The shorter length of the housing 214 is advantageous in situations where space is limited.

The present invention has been described with reference to coaxial optical components. The systems and methods for packaging and manufacturing coaxial optical components applies to components including, but not limited to, three port optical filter devices, three port optical filter devices with in-line isolators, three port optical power tap with detector, and the like or any combination thereof. The method may also apply to 4 or more port devices. The coaxial optical component illustrated in FIG. 2C can be used to form other coaxial optical components or devices such as the three port device illustrated in FIGS. 2D and 2E. In both cases, the dual fiber collimator and the optical substrate are packaged in one integrated process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A coaxial optical component for use in manufacturing optical devices, the coaxial component comprising:
   a collimating lens coupled to an optical filter substrate;
   a dual fiber pigtail coupled to the collimating lens to form a dual fiber collimator;
   a metal housing, wherein the dual fiber collimator is inserted in a first end of the metal housing such that the metal housing is disposed about the dual fiber collimator; and
   a plurality of glass spacers circumferentially disposed about the dual fiber collimator.

2. The coaxial optical component as set forth in claim 1, wherein the metal housing is securely attached to the plurality of spacers with optical epoxy.

3. The coaxial optical component as set forth in claim 1, wherein the collimating lens is a graded index lens.

4. The coaxial optical component as set forth in claim 1, wherein the collimating lens is a GRIN lens.

5. The coaxial optical component as set forth in claim 1, wherein the coaxial optical component is adapted to be used in at least one of:
   a power tap;
   an add/drop module
   a circulator; and
   an inline isolator.

6. The coaxial optical component as set forth in claim 1, wherein the metal housing comprises a least one solder hole formed in an extended portion of the metal housing that extends beyond the dual fiber collimator and the spacers, wherein the extended portion is configured to receive a second optical element for use with the dual fiber collimator.

7. The coaxial optical component as set forth in claim 1, wherein the dual fiber pigtail is aligned with the collimating lens to reduce reflection loss.

8. An coaxial optical component as set forth in claim 6, further comprising a single fiber collimator, wherein the single fiber collimator is secured within the extended portion of the housing such that a transmission loss between the single fiber collimator and the dual fiber collimator is reduced.

9. The coaxial optical component as set forth in claim 8, wherein the single fiber collimator is soldered to the metal housing.

10. An integrated coaxial optical component for use in manufacturing other optical devices, the coaxial optical component comprising:
   an optical filter substrate coupled to a collimating lens, wherein the collimating lens comprises a front face and a rear face and wherein the rear face is beveled to an angle;
   a dual fiber pigtail attached to the collimating lens with optical epoxy to form a dual fiber collimator, wherein the dual fiber pigtail comprises a pigtail front face and wherein the pigtail front face is beveled at an angle that is parallel to the rear face of the collimating lens, wherein the dual fiber pigtail is adequately aligned with the collimating lens such that a transmission loss is minimized;
   a plurality of glass spacers circumferentially disposed about the dual fiber collimator;
   a metal housing including a first end and a second end, wherein the dual fiber collimator and the plurality of spacers are inserted into the first end of the metal housing such that the plurality of spacers rest against an inside surface of the metal housing, wherein the dual fiber collimator and the plurality of spacers are permanently secured with the first end of the metal housing with epoxy, wherein the second end includes an extended portion that is adapted to receive an optical element.

11. The coaxial optical component as set forth in claim 10, wherein the collimating lens is one of a graded index lens and a c-lens.

12. The coaxial optical component as set forth in claim 10, wherein the coaxial optical component is adapted to be used in manufacturing at least one of:
   a power tap;
   an inline isolator;
   a three port device; and
   an add/drop module.

13. The coaxial optical component as set forth in claim 10, wherein the metal housing comprises at least one solder hole formed in the extended portion of the metal housing.

14. The coaxial optical component as set forth in claim 10, further comprising a second optical element inserted in the extended portion of the metal housing, wherein the second optical element is aligned with the dual fiber collimator.

15. The optical device as set forth in claim 14, wherein the second optical element is a single fiber collimator, and wherein the single fiber collimator is soldered to the metal housing.

16. A coaxial optical component for use in an optical device comprising:
   a metal housing having a first end, a second end, and an inside surface configured to receive a plurality of spacers, wherein an outer surface of the plurality of spacers are shaped to rest against the inside surface of the metal housing when the plurality of spacers are inserted within the metal housing, and wherein the plurality of spacers are glass; and
   a first optical element securely connected within the first end of the metal housing optical epoxy, wherein the first optical element is disposed within the plurality of spacers such that the first optical element is held against inside surfaces of the plurality of spacers, whereby the first optical element is securely positioned within the first end of the metal housing by the plurality of spacers.

17. The coaxial optical component as set forth in claim 16, wherein the first optical element further comprises:
  a collimating element;
  an optical filter substrate attached to the collimating element; and
  a dual fiber pigtail connected with the collimating element such that a transmission loss between the dual fiber pigtail and the collimating element is minimized.

18. The coaxial optical component as set forth in claim 16, wherein the second end includes an extended portion adapted to receive a second optical element.

19. The coaxial optical component as set forth in claim 18, wherein the extended portion comprises at least one solder hole.

20. The optical device as set forth in claim 19, wherein the second optical element is a single fiber collimator that is secured to the metal housing epoxy or solder.

* * * * *

UNITED STATES PATENT AND TRADEMARK OFFICE
CERTIFICATE OF CORRECTION

| | | |
|---|---|---|
| PATENT NO. | : 7,313,300 B1 | Page 1 of 1 |
| APPLICATION NO. | : 10/697456 | |
| DATED | : December 25, 2007 | |
| INVENTOR(S) | : Pin et al. | |

It is certified that error appears in the above-identified patent and that said Letters Patent is hereby corrected as shown below:

Column 2
Line 14, change "pigtail and" to --pigtail 108, 109 and--
Line 18, delete "130"
Line 36, after "120" add --, including fiber 126 and filter substrate 122--
Line 53, delete "130"
Line 63, delete "130"

Column 3
Line 48, change "element" to --elements--

Column 5
Line 12, after "200" add --, including fibers 210 and 212,--
Line 36, delete "215"
Line 39, delete "217"
Line 66, after "232" add --, including pigtail 234,--

Column 6
Line 27, change the first instance of "216" to --218--
Line 32, change "an exemplary" to --exemplary--

Signed and Sealed this

Twentieth Day of July, 2010

David J. Kappos
*Director of the United States Patent and Trademark Office*